Jan. 12, 1960 — W. C. MOOG, JR — 2,920,650

VALVE BUSHING

Filed Aug. 3, 1953

INVENTOR.
WILLIAM C. MOOG, JR.
BY
Beau, Brooks, Buckley & Beau,
ATTORNEYS.

United States Patent Office 2,920,650
Patented Jan. 12, 1960

2,920,650

VALVE BUSHING

William C. Moog, Jr., East Aurora, N.Y., assignor to Moog Servocontrols, Inc., a corporation of New York Application August 3, 1953, Serial No. 371,933

5 Claims. (Cl. 137—622)

This invention relates generally to valve spool bushings and mounting arrangements therefor, and this application comprises a continuation in part of my pending application Serial No. 356,631, now Patent No. 2,767,689.

Valve spool bushings such as that disclosed in my copending application must meet certain critical requirements. For example, the valve spool controlled openings through the bushing must be accurately positioned axially of the bushing with relation to each other and with relation to the valve spool. This is necessary in order that when the valve spool is actuated in response to a signal it will immediately open the desired port to the required degree in order to secure the proper response. Thus, if the spool controlled openings are not accurately positioned relative to each other and to the valve spool, the desired accuracy of control cannot be achieved.

Also, it is highly desirable that the spool controlled openings be of flat-sided form, as distinguished from round openings, whereby the response in terms of fluid flow through said openings will be linear as the valve spool moves to open said openings. In addition, it is desired to enable relatively large fluid flow without unduly increasing the axial stroke of the valve spool such as might adversely affect the accuracy of the mechanism.

Normally, bushings are formed from an integral member, but it is seriously questioned whether a bushing meeting the foregonig requirements can be so formed using conventional techniques, and in any event to so form such a bushing would be impractical.

Furthermore, it will be observed from my copending application that the valve body is preferably made of aluminum, whereas the bushing is made of steel, the bushing being retained in place by end caps which bear thereagainst and are fastened to the valve body. Normally, the end caps would be formed to bear simultaneously against the bushing and the valve body, but it has been found that upon unequal expansion of the valve body and the bushing under abnormal temperature conditions there is a tendency for the end caps to separate completely from the bushing, permitting the bushing a limited floating movement which, no matter how limited in degree, adversely affects the accuracy of the mechanism.

Accordingly, it is an object of this invention to provide a valve spool bushing of this general type having accurately positioned spool controlled openings of the desired shape, together with a novel method of making the same which is relatively inexpensive, highly practical, and which utilizes conventional tools and techniques.

Another object of this invention is to provide a bushing mounting arrangement similar to that disclosed in my copending application but designed to enable relative expansion between the valve body and the valve spool while avoiding any free floating of the bushing in the body.

The method of making a valve spool bushing according to my invention is characterized in that the bushing is formed in a number of component parts for assembly in end-to-end relation, forming certain component part ends to a substantially smooth and flat surface radial to the bore, forming radial recesses of the desired form in certain component part ends, assembling said component parts in end-to-end relation, whereby said formed ends abut to define the desired openings, and joining said component parts in assembled relation.

A bushing according to my invention is characterized in having a number of abutting components, certain components having substantially smooth radial ends defining one wall part of radial openings in said bushing, the component ends abutting said radial ends having radial recesses therein to define the other side wall parts of said openings, said components being joined together.

A bushing mounting arrangement according to my invention is characterized by the provision of end caps bearing against opposite ends of the bushing and having fastening flanges formed with limited clearance from the valve body part to which said flanges are fastened by being sprung thereagainst.

The foregoing and other objects will become clearly apparent from the ensuing detailed description, taken together with the accompanying drawing forming a part thereof wherein.

Figure 1:
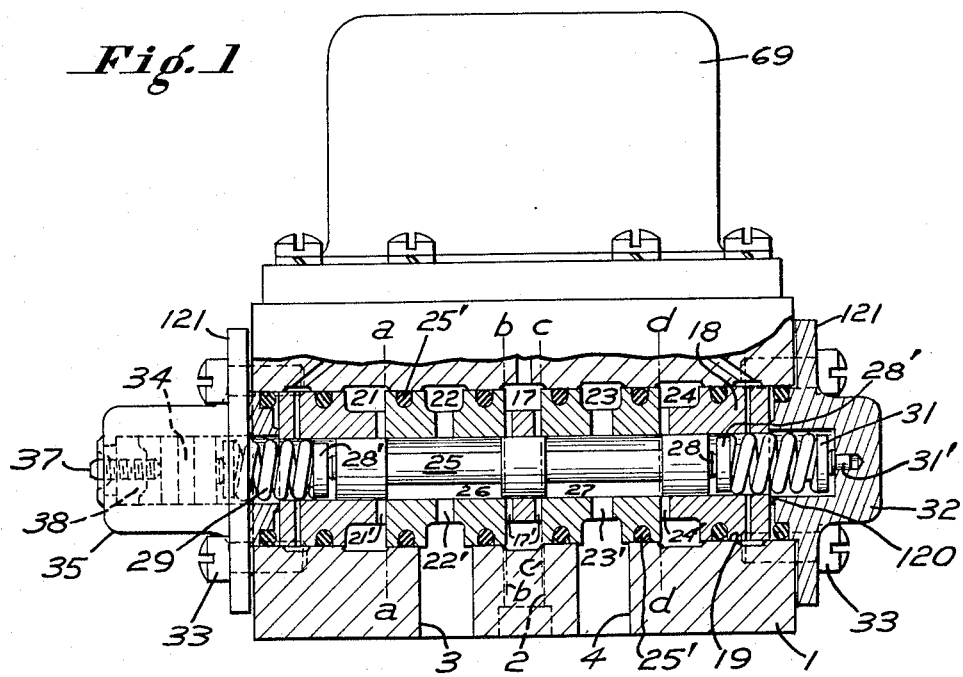
Fig. 1 is a somewhat schematic view in side elevation of an electro-hydraulic servo mechanism of the type disclosed in my copending application, with the bushing and related parts being shown in section for purposes of this invention.

While not necessarily limited thereto, or even to valve spool bushings generally, my invention is disclosed herein with respect to the valve spool bushing assembly disclosed in my above identified copending application. Thus, there is illustrated in Fig. 1 a valve body 1 formed preferably of aluminum and having therein a pressure fluid supply port 2 and pressure fluid control ports 3 and 4. Bushing 18 is mounted within the valve body bore 19, and said bushing has a series of annular grooves therearound which cooperate with annular recesses in the wall of bore 19 to define therebetween a series of annular passages 17, 21, 22, 23 and 24, passages 22 and 23 communicating with ports 3 and 4, respectively, and passage 17 communicating with port 2.

Bushing 18 has a series of radial passages 17', 21', 22', 23' and 24' for placing the corresponding annular passages in communication with the bore of said bushing. In addition, bushing 18 is provided intermediate each of the aforesaid annular passages and adjacent the opposite ends thereof with annular grooves adapted to receive therein O ring seals 25' adapted to bear against the wall of bore 19 for fluid sealing purposes.

A valve spool 25 is slidably mounted within bushing 18 for axial movement therein, said spool being provided with spaced annular grooves 26 and 27 on opposite sides of the midpoint thereof for selectively placing passages 17 in communication with passages 22 and 23 to control fluid flow through control ports 3 and 4 as fully described in my copending application.

Fig. 1 also shows the pivot pins 28, members 28', springs 29, members 31, pivot pins 31', member 34, end block 38, and adjustment screw 37, all as and for the purpose disclosed in my copending application, together with end caps 32 and 35 secured to valve body 1 as by means of screws 33. Cap 69 contains an electromagnetic motor and various nozzles all as disclosed in my copending application, whereby valve spool 25 is driven by changes in the pressure differential between separate hydraulic amplifiers acting on opposite ends thereof induced by a signal responsive electric motor, the valve spool being proportionately controlled in response to the magnitude of the control signal, all as fully set forth in my copending application. Thus, the arrangement of Fig. 1, except as to certain details of end cap construction as will appear more fully hereinafter, and the operation thereof correspond to the disclosure of my copending application, and reference is accordingly made thereto for such further description as may be necessary.

As previously set forth, this application is in part concerned with the bushing construction and with a method of making the bushing, and this will now be described. In order to achieve a high degree of accuracy in the valve mechanism, control movements of valve spool 25 should be relatively slight, and accordingly openings 21', 17' and 24' must be accurately positioned with respect to each other and to valve spool 25. It will be observed from the illustrated embodiment that there are four critical planes $a$, $b$, $c$ and $d$, which planes define the side of passages 21', 17', 17' and 24', respectively, which open first upon opening movements of valve spool 25. These side wall parts must be accurately positioned so that the passages will be opened to the desired degree upon control movements of valve spool 25.

In addition, it is considered essential that passages 21', 17', 17' and 24' be of flat-sided form, whereby the response of the valve as determined by the flow of pressure fluid through the appropriate passages as the valve spool is moved remains essentially linear.

It will be appreciated that to make such a bushing from a single piece of metal using conventional techniques is impractical if not impossible.

Figure 2:
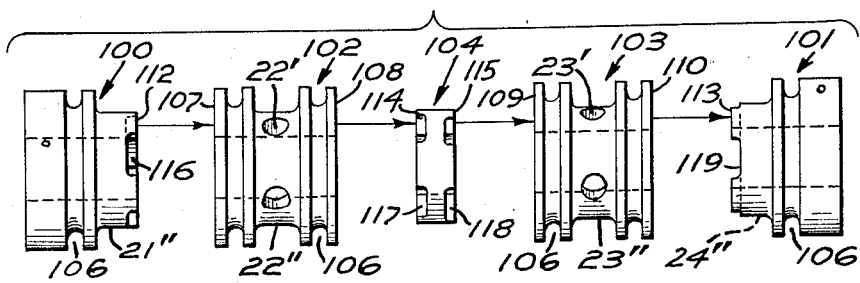
Fig. 2 is an exploded view of the separate component parts of the valve spool bushing.
Figure 3:
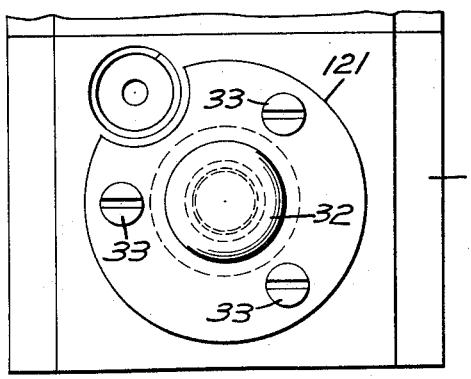
Fig. 3 is an end view showing the end cap construction.

In accord with my invention, bushing 18 is formed of a number of separate component parts identified in Fig. 2 as comprising opposed end parts 100 and 101, intermediate parts 102 and 103, and a center part 104. These parts are initially formed to the approximate size desired, and are adapted for assembly in end-to-end relation as indicated in Fig. 2 to comprise the bushing.

Annular grooves 106 are roughly formed in the end and intermediate parts 100, 101, 102 and 103, such grooves being adapted when finished to receive the O-ring seals 25', and larger annular grooves 21'', 22'', 23'' and 24'' are formed therein for defining with the wall of bore 19 the corresponding annular passages therearound. These grooves are formed in a conventional manner as on a lathe, using appropriate forming tools. Also, center part 104 is formed to the proper diameter whereby to define with the wall of bore 19 the annular passage 17. The passages 22' and 23' are formed in parts 102 and 103 as by conventional drilling techniques, the passages so formed being perfectly acceptable for the intended purpose.

Most important, the critical openings 21', 17', 17' and 24' are formed at this stage, and this is accomplished in the following manner. It will be observed that end faces 107 and 108 of part 102 are adapted to lie in planes $a$ and $b$, respectively, and that end faces 109 and 110 of part 103 are adapated to lie in planes $c$ and $d$, respectively These end faces are ground down until the parts 102 and 103 provide the desired distance between their end faces and until said end faces are substantially smooth and normal to the bore. It will be appreciated that this requires only conventional grinding techniques, and is readily accomplished by virtue of the component parts being separate. Thus, the critical wall surfaces of the spool controlled passages are thus accurately formed and positioned.

The end faces 112 and 113 of parts 100 and 101 are similarly ground to substantial smoothness to properly abut the end faces 107 and 110, and the center part 104 has its opposite end faces 114 and 115 similarly ground to substantial smoothness and to provide the necessary spacing between end faces 108 and 109.

In this way, the critical passage surfaces defined by the planes $a$, $b$, $c$ and $d$ are readily and accurately formed by conventional grinding techniques.

While the component parts remain separate, flat-walled recesses 116, 117, 118, and 119 are formed in end faces 112, 114, 115 and 113, respectively, as by conventional milling techniques whereby to define the other wall parts of the critical passages and whereby the desired flat-sided passage is readily achieved. It will be noted that recesses of any desired size and number can be readily formed in this manner.

The abutting surfaces 107 and 112, 108 and 114, 109 and 115, and 110 and 113 are then copper plated, and the parts are assembled in end-to-end relation in the order illustrated in Fig. 2, as on a ceramic rod whereby they are substantially centered. When thus assembled, the parts are then brazed together, as by conventional copper brazing techniques in a temperature of, for example, approximately 2050° F., following which said parts are securely joined in the desired assembled relation. It will be appreciated that suitable alloys can be used in place of copper, and other materials such as copper shim stock can be used instead of plating.

The assembled bushing parts are then hardened as by heat treating with a temperature of from 1400° F. to 1700° F., following which the grooves 106 are finished and the assembled bushing is finished to the desired form, utilizing conventional techniques.

Thus, by means of my invention, a bushing is provided wherein the spool controlled passages are extremely accurately positioned and are of the desired flat-sided form to provide an accurate linear response, the bushing being made by conventional and inexpensive techniques in a highly practical manner.

In addition, it will be appreciated that any number of recesses, and recesses of any desired size, can readily be formed in the appropriate end faces to provide the desired flow of control fluid through the passages defined thereby, all without requiring an excessive stroke of the valve spool such as might adversely affect the valve performance.

Also, the copper brazing joining of the parts enables subsequent heat treating thereof. This invention is further concerned with a novel end cap construction such as to compensate for unequal expansion of the aluminum valve body and the steel bushing.

Thus, end caps 32 and 35 are each formed at their inner ends with a circular raised boss portion 120 adapted to bear against the opposite ends of bushing 18 to retain the same in centered relation. Said boss portions 120 are relatively thin, having for example a thickness on the order of 0.01'', and are designed to bear against bushing 18 adjacent the bore therethrough, whereby to minimize and essentially eliminate any undesired twisting action between the bushing and the end caps upon fastening the end caps on the valve body. Also, since the end caps are formed of aluminum, stresses between the bushing and the end caps such as might adversely affect the positioning of the bushing would be relatively high by reason of the thin boss portions and would thereby deform the aluminum end cap boss portion 120 instead of causing an undesired twisting action on the bushing.

Normally, end caps 32 and 35 would be formed with the lateral fastening flange portions 121 thereof adapted to abut the ends of valve body 1 upon boss portions 120 contacting bushing 18. However, when so formed, it has been found that under relatively extreme temperature conditions to which these valves might be subject, the expansion of the steel bushing and of the aluminum valve body is likely to be so unequal as to cause the body to expand and lift said end caps completely away from the opposite ends of bushing 18, whereby said bushing is left free to float within bore 19. It will be appreciated that even a slight free floating action would seriously affect the accuracy of the valve.

This undesirable result is precluded according to my invention by forming end caps 32 and 35 to provide a slight clearance on the order of .003 inch between fastening flange portions 121 and body 1. Thus, as illustrated in Fig. 1, with the boss portions 120 bearing against the opposite ends of bushing 18, there will be the aforesaid clearance between the body and the flange portions 121. Screws 33 are then tightened whereby flange portions 121 are sprung in through said clearance to abut the valve body. With this arrangement, the end cap fastening flange portions are sprung in for fastening purposes, and the springing action of said flange portions 121 will absorb and compensate for unequal expansion between body 1 and bushing 18 such as to substantially avoid freeing bushing 18 under expected conditions of use. Also, this arrangement precludes undesired variation in the pressure loading of springs 29 on valve spool 25 by reason of such unequal expansion.

Accordingly, it will be seen that my invention has fully accomplished the aforesaid objects. While this invention has been disclosed in but one embodiment thereof, the same obviously is not limited to the details of such embodiment, and it is intended that the scope of this invention be defined solely by the appended claims.

Having fully disclosed and completely described my invention, together with its mode of operation, what I claim as new is:

1. A fabricated bushing for a precision hydraulic servo valve mechanism and having a series of critically longitudinally spaced diametral passages therein and adapted to receive a close-fitting and slidable valve spool having square-cornered radially flat-sided lobes for opening and closing said passages, said bushing comprising a plurality of tubular bushing parts including at least one intermediate part of a predetermined axial length and end parts at opposite ends thereof and physically bonded together by their abutting end faces to provide a unitary structure, each of said end parts having at least one flat-sided diametral slot recessed from its end face which abuts said intermediate part and that portion of the end face of said intermediate part opposite said slot being smooth, flat and normal to the axis of the longitudinal bore of the bushing whereby diametrically opposite, radially alined, flat-sided passages are provided.

2. In a precision hydraulic servo valve mechanism, the combination comprising a valve body having a cylindrical bore therethrough, a cylindrical unitary bushing arranged within said bore, an axially slidable lobed valve spool arranged entirely within said bushing and supported radially solely thereby, said bushing having radial passages at predetermined intervals along its length, annular sealing means surrounding said bushing and interposed between said bushing and valve body and on opposite sides of said passages and adapted to accommodate relative radial movement between said bushing and valve body due to thermal expansion, and means for maintaining a predetermined axial positioning relationship between said bushing and valve spool under varying temperature conditions.

3. In a valve mechanism, the combination comprising a valve body having a bore therethrough, a bushing arranged within said bore, an axially slidable valve spool arranged within said bushing, and means for maintaining a predetermined positioning relationship between said bushing and valve spool under varying temperature conditions, said means including end cap members fitting the opposite ends of said bore and each bearing against an end of said bushing, positioning means interposed between said valve spool at each end thereof and the adjacent one of said end cap members, flexible fastening flange portions on each of said end cap members extending over said body adjacent the bore thereof and having a predetermined clearance from said body when said end cap members bear against said bushing and fasteners adapted to draw said flange portions toward said body whereby said bushing is constantly under a compressive load exerted by said end cap members.

4. In a valve mechanism, the combination comprising a valve body having a cylindrical bore therethrough, a cylindrical bushing arranged within said bore, an axially slidable valve spool arranged within said bushing, and means for maintaining a predetermined positioning relationship between said bushing and valve spool under varying temperature conditions, said means including end cap members fitting the opposite ends of said bore and each having a boss portion bearing against the respective end of said bushing, positioning means interposed between said valve spool at each end thereof and the adjacent one of said end cap members, an annular flexible fastening flange on each of said end cap members extending over said body adjacent the bore thereof and having a predetermined clearance from said body when said boss portions bear against said bushing and fasteners adapted to draw said flanges toward said body whereby said bushing is constantly under a compressive load exerted by said end cap members.

5. A bushing for a precision hydraulic servo valve mechanism and having a series of critically longitudinally spaced diametral passages therein and adapted to receive a close-fitting and slidable valve spool having square-cornered radially flat-sided lobes for opening and closing said passages, said bushing comprising a plurality of tubular bushing parts including at least one intermediate part of a predetermined axial length and end parts at opposite ends thereof, the opposing end faces of said parts abutting each other, each of said end parts having at least one flat-sided diametral slot recessed from its end face which abuts said intermediate part and that portion of the end face of said intermediate part opposite said slot being smooth, flat and normal to the axis of the longitudinal bore of the bushing whereby diametrically opposite, radially alined, flat-sided passages are provided.

References Cited in the file of this patent

UNITED STATES PATENTS

| | | |
|---|---|---|
| 1,016,167 | McCulloch | Jan. 30, 1912 |
| 1,164,600 | Forster | Dec. 14, 1915 |
| 1,732,241 | Murray | Oct. 22, 1929 |
| 2,261,489 | Venton | Nov. 4, 1941 |
| 2,410,404 | Buchanan | Nov. 5, 1946 |
| 2,601,990 | Holzer | July 1, 1952 |
| 2,624,585 | Churchill | Jan. 6, 1953 |
| 2,630,135 | Johnson | Mar. 3, 1953 |
| 2,645,450 | Chessman | July 14, 1953 |
| 2,743,900 | Holzer et al. | May 1, 1956 |
| 2,767,689 | Moog | Oct. 23, 1956 |